(12) United States Patent
Aizawa et al.

(10) Patent No.: US 7,436,107 B2
(45) Date of Patent: Oct. 14, 2008

(54) ANGULAR VELOCITY SENSOR AND METHOD FOR MANUFACTURING THE SAME

(75) Inventors: Hiroyuki Aizawa, Osaka (JP); Satoshi Ohuchi, Hyogo (JP); Takeshi Yamamoto, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 290 days.

(21) Appl. No.: 10/566,632

(22) PCT Filed: Jun. 30, 2005

(86) PCT No.: PCT/JP2005/012023

§ 371 (c)(1),
(2), (4) Date: Jan. 31, 2006

(87) PCT Pub. No.: WO2006/003963

PCT Pub. Date: Jan. 12, 2006

(65) Prior Publication Data

US 2007/0120449 A1    May 31, 2007

(30) Foreign Application Priority Data

Jul. 1, 2004    (JP)    ............................ 2004-195189

(51) Int. Cl.
*H01L 41/08*    (2006.01)
(52) U.S. Cl. ...................... 310/370; 310/312
(58) Field of Classification Search ................ 310/321, 310/370
See application file for complete search history.

(56) References Cited

U.S. PATENT DOCUMENTS

| 5,117,148 A | 5/1992 | Nakamura et al. |
|---|---|---|
| 6,719,914 B2 * | 4/2004 | Nakatani et al. ............... 216/36 |
| 7,002,284 B2 * | 2/2006 | Ouchi et al. ................. 310/370 |
| 7,107,843 B2 * | 9/2006 | Ohuchi et al. ............. 73/504.16 |
| 7,176,604 B2 * | 2/2007 | Nakatani ..................... 310/370 |
| 7,260,990 B2 * | 8/2007 | Ohuchi et al. ............ 73/504.12 |
| 2004/0132310 A1 | 7/2004 | Nakatani et al. |

FOREIGN PATENT DOCUMENTS

| JP | 60-73414 | 4/1985 |
|---|---|---|
| JP | 60-118911 | 8/1985 |
| JP | 61-191917 | 8/1986 |
| JP | 3-150914 | 6/1991 |
| JP | 10-132573 | 5/1998 |
| JP | 10-153433 | 6/1998 |
| JP | 2003-218420 | 7/2003 |

* cited by examiner

*Primary Examiner*—Mark Budd
(74) *Attorney, Agent, or Firm*—McDermott Will & Emery LLP

(57) ABSTRACT

Provided is an angular velocity sensor which is thin, requires no individual adjustment and can control the generation of signals that are unnecessary to the angular velocity sensor and are generated on the sensing electrodes when the tuning fork is made to vibrate in the X-axis direction, and a method for manufacturing the angular velocity sensor. Centers (8*d*) and (9*d*) of top electrodes (8*c*) and (9*c*) as components of detection units are shifted by $\Delta W$ from centers (10) and (11) of main surfaces (3*a*) and (3*b*) of arms (1*a*) and (1*b*) of the tuning fork vibrator towards side surfaces (3*c*) and (3*e*) adjacent to main surfaces (3*a*) and (3*b*), respectively.

19 Claims, 10 Drawing Sheets

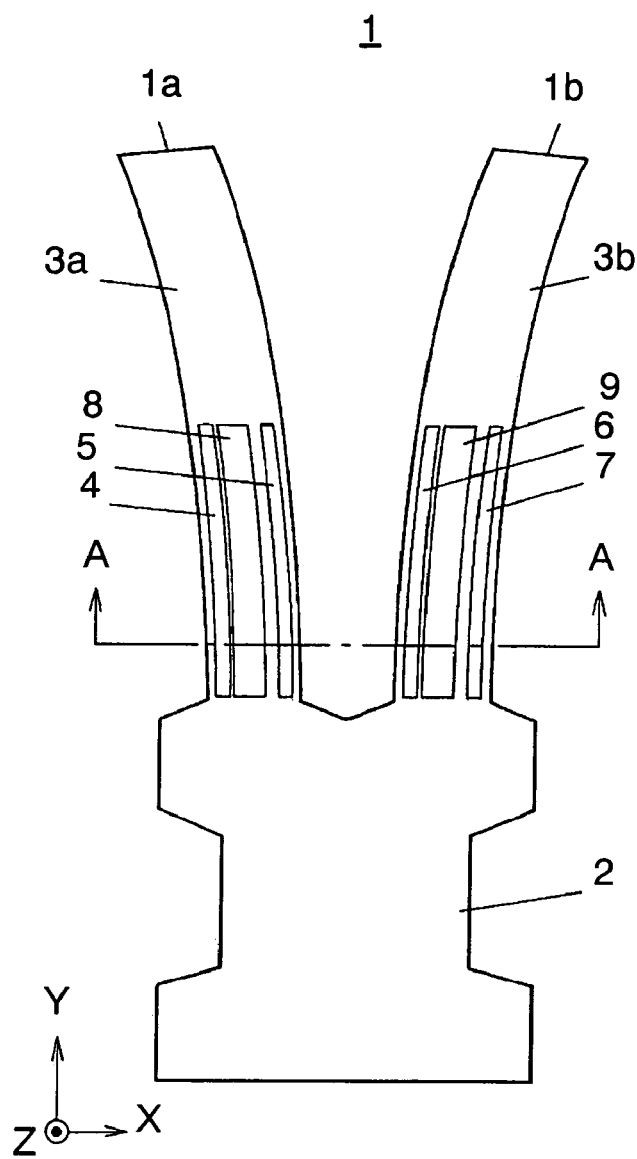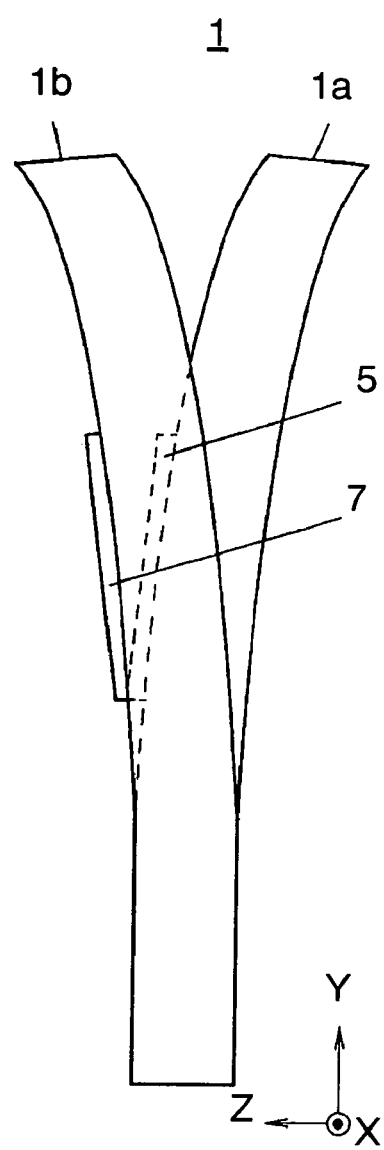

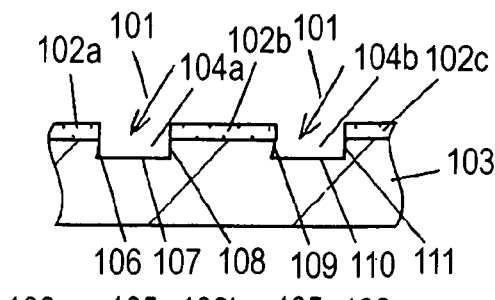
FIG. 8A
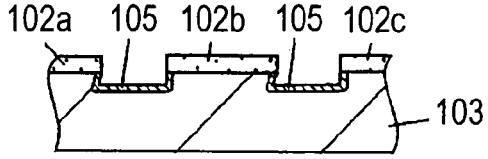
FIG. 8B
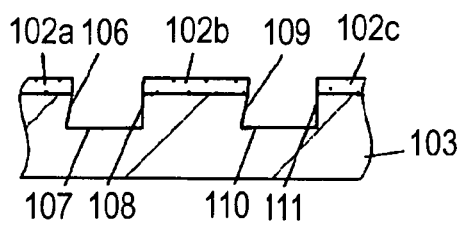
FIG. 8C
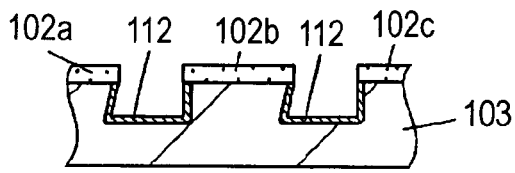
FIG. 8D
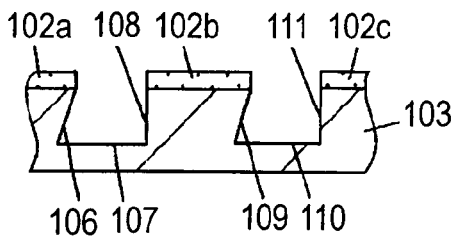
FIG. 8E
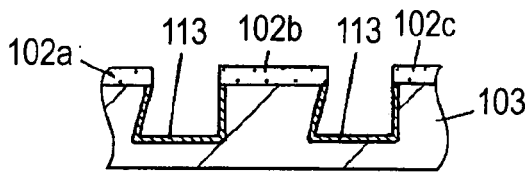
FIG. 8F
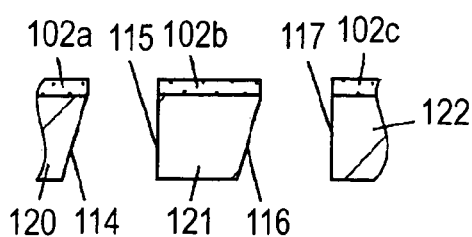
FIG. 8G
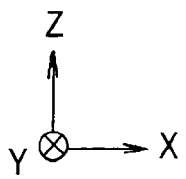

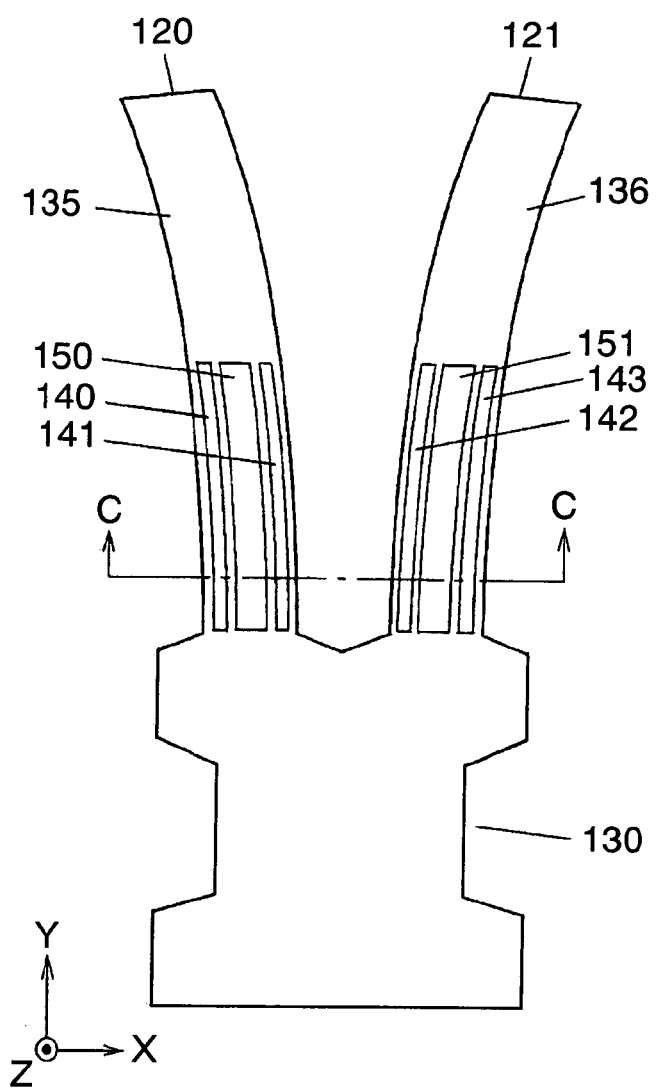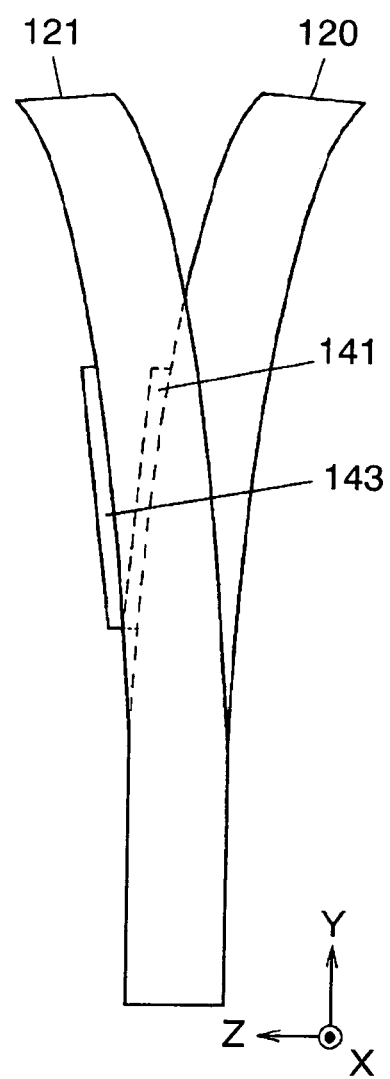

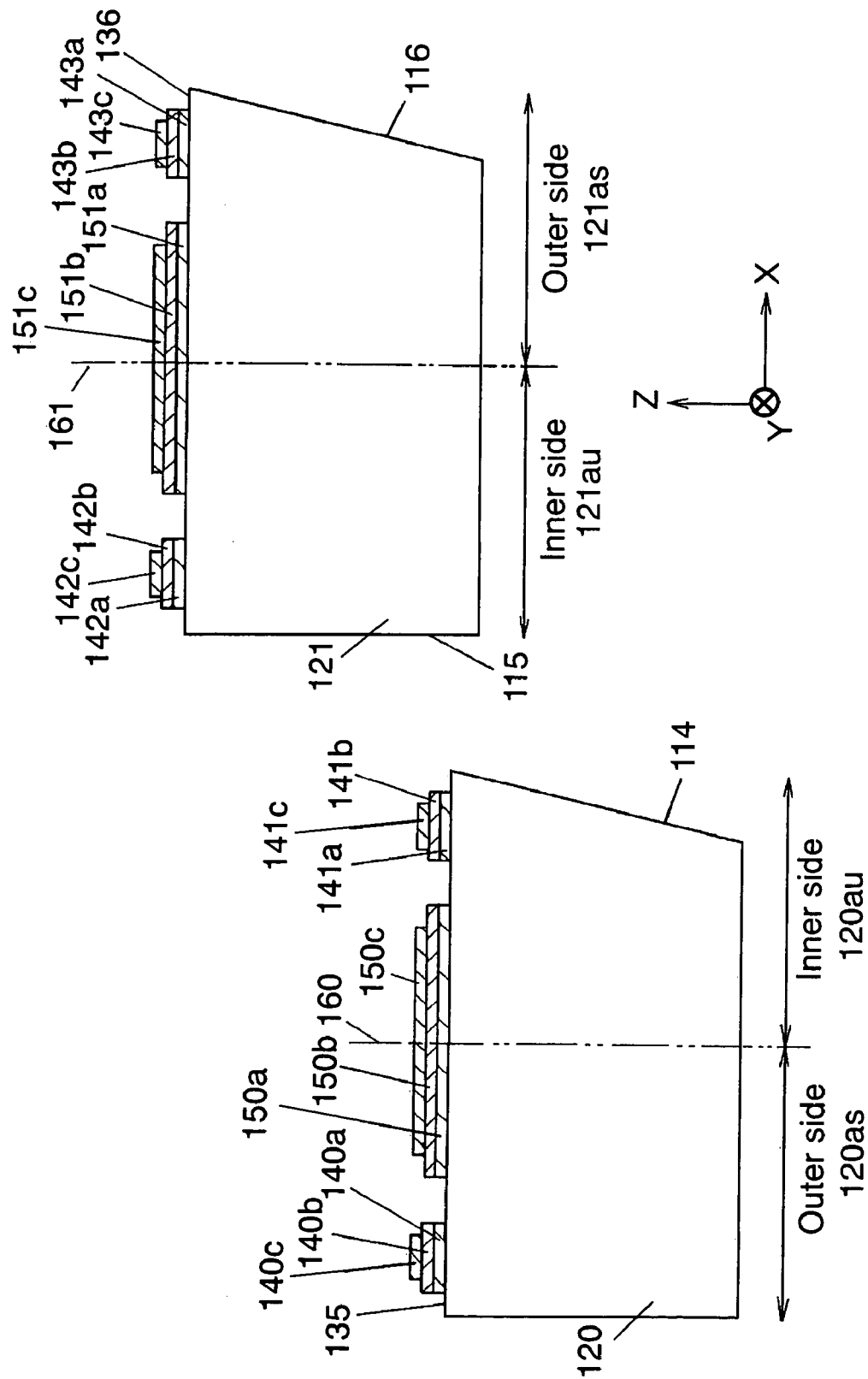

ANGULAR VELOCITY SENSOR AND METHOD FOR MANUFACTURING THE SAME

This application is the U.S. National Phase under 35 U.S.C. § 371 of International Application No. PCT/JP2005/012023, filed Jun. 30, 2005, which in turn claims the benefit of Japanese Application No. 2004-195189, filed Jul. 1, 2004, the disclosures of which Applications are incorporated by reference herein in their entirety.

TECHNICAL FIELD

The present invention relates to an angular velocity sensor capable of controlling the generation of signals which are unnecessary to the angular velocity sensor and are generated in the sensing electrodes when the tuning fork is made to vibrate in the X-axis direction, and also relates to a method for manufacturing the angular velocity sensor.

BACKGROUND ART

One known method for manufacturing a tuning fork vibrator for an angular velocity sensor by dry etching is shown in FIG. 7. FIG. 7 shows plasma source 100 for dry etching, travel direction 101 of plasma emitted from plasma source 100, resist film 102 as a dry-etching mask and wafer 103.

Resist film 102 is provided with openings to form a plurality of tuning fork vibrators in wafer 103. Resist film 102 is first applied on a main surface of wafer 103 and is then dry etched with plasma emitted from plasma source 100 so as to manufacture tuning fork vibrators. Travel direction 101 of the plasma shown in FIG. 7 is not at an equal angle with respect to the entire surface of wafer 103. More specifically, the plasma is applied in the direction of the normal (perpendicular) to the main surface of wafer 103 just below and near plasma source 100, but is applied at a smaller angle of emission as the region on the main surface gets farther from plasma source 100.

FIGS. 8A-8G show processes of a method for manufacturing a tuning fork vibrator for an angular velocity sensor, and are enlarged views of the area inside circle "P" shown in FIG. 7. FIG. 8A shows that wafer 103 made of a silicon substrate is provided on a main surface thereof with resist film 102a, resist film 102b and resist film 102c. Resist films 102a and 102b have opening 104a therebetween, and resist films 102b and 102c have opening 104b therebetween. Openings 104a and 104b are formed by emitting plasma from plasma source 100 in travel direction 101 as shown in FIG. 7 on the main surface of wafer 103 using resist films 102a, 102b and 102c as masks. Emission direction 101 of the plasma is tilted from the normal to wafer 103. In other words, emission direction 101 of the plasma is not orthogonal (at 90 degrees) to the main surface of wafer 103. As a result, side surface 106 and side surface 109 of openings 104a and 104b, respectively, are applied with and etched by the plasma, thus becoming tilted surfaces, not vertical surfaces.

Opening 104a has side surface 106, side surface 108 and bottom 107. Opening 104b has side surface 109, side surface 111 and bottom 110.

FIG. 8B shows that openings 104a and 104b formed in the process of FIG. 8A are coated with protective film 105. Protective film 105 is formed to minimize the influence of the side etching.

In FIGS. 8C and 8E, on the other hand, side surfaces 108 and 111 opposed to these side surfaces are hardly influenced by the plasma emission because of being in the shadow of resist films 102b and 102c, respectively. In other words, these side surfaces are not influenced by the side etching and are left in parallel with the normal direction of the main surface of wafer 103.

FIGS. 8C-8F show the repetition of the processes of FIGS. 8A and 8B. More specifically, FIGS. 8C and 8F show openings which are different in depth from those in FIG. 8A, but are nearly the same in shape as them. FIGS. 8D and 8F show openings which are different in depth from those in FIG. 8B, but are nearly the same in shape as them. Protective film 112 shown in FIG. 8D is formed for the same purpose as protective film 105 shown in FIG. 8B. That is, to minimize the influence of the side etching on side surfaces 106, 108, 109 and 111 shown in FIG. 8C.

FIG. 8G shows that arms 120, 121 and 122 of tuning fork vibrators are separated from wafer 103 by a final dry etching with plasma applied on protective film 113 shown in FIG. 8F. Protective film 113 shown in FIG. 8F is formed for the same purpose as protective films 105 and 112.

In FIG. 8G, side surfaces 114 and 116 are tilted in travel direction 101 of the plasma as the result of the plasma side etching, in the same manner as surfaces 106 and 109 shown in FIG. 8A that correspond to the side surfaces of arms. Side surfaces 115 and 117, which are hardly influenced by the plasma side etching, are left nearly in parallel with the normal to wafer 103.

FIGS. 9A, 9B and 10 show the state of displacement of a tuning fork vibrator when driven in the X-axis direction, the tuning fork vibrator being manufactured by the method for manufacturing a tuning fork vibrator for an angular velocity sensor shown in FIGS. 7 and 8. FIG. 9A is a plan view of the tuning fork vibrator driven in the X-axis direction; FIG. 9B is a side view of FIG. 9A; and FIG. 10 is a cross sectional view taken along the line C-C of FIG. 9A.

In FIGS. 9A and 9B, arm 120 and arm 121 are connected to each other and supported by base 130. Arms 120 and 121 have main surface 135 and main surface 136, respectively. Arm 120 is provided on main surface 135 with drive unit 140 and drive unit 141. Arm 121 is provided on main surface 136 with drive unit 142 and drive unit 143. Arm 120 is further provided with detection unit 150 on main surface 135, and Arm 121 is further provided with detection unit 151 on main surface 136.

FIG. 10 shows arm 120 on its left side, and arm 121 on its right side. Arm 120 is provided, on outside 120as of main surface 135, with bottom electrode 140a, piezoelectric film 140b subjected to a polarization treatment in the direction perpendicular to its film surface and top electrode 140c, which are stacked in this order.

Arm 120 is further provided, on inside 120au of main surface 135, with bottom electrode 141a, piezoelectric film 141b subjected to a polarization treatment in the direction perpendicular to its film surface and top electrode 141c, which are stacked in this order.

Arm 120 is further provided, on approximately center 160 of main surface 135, with bottom electrode 150a, piezoelectric film 150b subjected to a polarization treatment in the direction perpendicular to its film surface and top electrode 150c, which are stacked in this order. Electrodes 150a, 150c and piezoelectric film 150b are made nearly symmetric with respect to center 160.

Drive unit 140 shown in FIG. 9 is made up of bottom electrode 140a, piezoelectric film 140b and top electrode 140c shown in FIG. 10. Drive unit 141 is made up of bottom electrode 141a, piezoelectric film 141b and top electrode 141c. Detection unit 150 is made up of bottom electrode 150a, piezoelectric film 150b and top electrode 150c.

On the other hand, arm 121 on the right side of FIG. 10 has a structure similar to arm 120 described above. More specifically, arm 121 is provided, on outside 121as of main surface 136, with bottom electrode 143a, piezoelectric film 143b subjected to a polarization treatment in the direction perpendicular to its film surface and top electrode 143c, which are stacked in this order.

Arm 121 is further provided, on inside 121au of main surface 136, with bottom electrode 142a, piezoelectric film 142b subjected to a polarization treatment in the direction perpendicular to its film surface and top electrode 142c, which are stacked in this order.

Arm 121 is further provided, on approximately center 161 of main surface 136, with bottom electrode 151a, piezoelectric film 151b subjected to a polarization treatment in the direction perpendicular to its film surface and top electrode 151c, which are stacked in this order. Electrodes 151a, 151c and piezoelectric film 151b are made nearly symmetric with respect to center 161.

Drive unit 142 shown in FIG. 9 is made up of bottom electrode 142a, piezoelectric film 142b and top electrode 142c shown in FIG. 10. Drive unit 143 is made up of bottom electrode 143a, piezoelectric film 143b and top electrode 143c. Detection unit 151 is made up of bottom electrode 151a, piezoelectric film 151b and top electrode 151c.

The following is a description about driving the tuning fork vibrator in the X-axis direction.

In FIG. 10, top electrodes 140c and 143c are applied with drive voltages of the same phase. This shrinks piezoelectric films 140b and 143b formed on the respective top electrodes in the Y-axis direction. On the other hand, top electrodes 141c and 142c are applied with drive voltages having a phase opposite to the drive voltages to be applied on top electrodes 140c and 143c so as to stretch piezoelectric films 141b and 142b in the Y-axis direction. As a result, as shown in FIG. 9A, arms 120 and 121 vibrate outwards from each other in the X-axis direction.

The application of the dry etching causes side surfaces 114 and 116 of arms 120 and 121, respectively, to be tilted in travel direction 101 of the plasma as shown in FIGS. 7, 8 and 10. The tiltings of side surfaces 114 and 116 cause vibration which vibrates arms 120 and 121 in the X-axis direction, and at the same time, outwards from each other in the Z-axis direction.

As a result, piezoelectric film 150b as a component of the detection unit is applied with the stress to stretch it in the Z-axis direction. Piezoelectric film 151b as a component of the other detection unit is applied with the stress to shrink it in the Z-axis direction. These stresses cause top electrodes 150c and 151c as components of the respective detection units to have charges with polarities opposite to each other. Thus, just driving the tuning fork vibrator in the X-axis direction causes top electrodes 150c and 151c of the detection units to have electric charges (unnecessary signals) which make it seem as if an angular velocity were applied around the Y axis, although it is not applied.

In the aforementioned method for manufacturing a tuning fork vibrator for an angular velocity sensor, the arms of the tuning fork vibrators formed in wafer 103 gradually change in cross section from rectangular to trapezoidal from the center of wafer 103 to the periphery. More precisely, the tuning fork vibrators have arms different in cross section depending on the position in wafer 103 at which the tuning fork vibrators are formed. As a result, when vibrating in the X-axis direction, the tuning fork vibrators formed far from the center of wafer 103 inevitably cause unnecessary vibration components in a direction (the Z-axis direction) other than the direction in which to vibrate the tuning fork vibrators.

FIG. 11 shows the generation amount of signals which are unnecessary to the angular velocity sensor and are generated on the sensing electrodes when the tuning fork vibrators formed at different positions in wafer 103 are made to vibrate in the X-axis direction. The horizontal axis shows the distance from the center of wafer 103 in the X-axis direction, that is, the position in the X-axis direction. The vertical axis shows the size of the unnecessary signals generated on the sensing electrodes, the size being expressed in an arbitrary unit.

The generation of such unnecessary vibration components can be controlled by adopting, for example, an adjustment method disclosed in Japanese Patent Unexamined Publication No. 10-132573. In this adjustment method, each tuning fork vibrator formed in wafer 103 is provided with a mask (unillustrated) having openings in such a manner that the mask is pasted integrally on each tuning fork vibrator. In this state, the arms of each tuning fork vibrator are continuously weighed to increase or decrease the weight until no unnecessary vibration components are generated in a direction other than the direction in which to make the tuning fork vibrate.

However, in the above-described conventional angular velocity sensor and method for manufacturing it, the tuning fork vibrators in wafer 103 have arms different from each other in cross section depending on the positions in wafer 103 at which the tuning fork vibrators are formed. Therefore, if the adjustment method is adopted, each tuning fork vibrator must be covered with a mask having openings in such a manner that the mask is pasted integrally on the tuning fork vibrator so as to adjust the shape in cross section of its arms, making it inevitable for the finished angular velocity sensors to have a large thickness. As another inconvenience, the shape in cross section of the arms must be adjusted for each and every angular velocity sensor to complete all the angular velocity sensors.

Therefore, the present invention has an object of providing an angular velocity sensor capable of controlling the generation of signals which are unnecessary to the angular velocity sensor and are generated in the sensing electrodes when the tuning fork is made to vibrate in the X-axis direction, the angular velocity sensor also being thin in thickness and requiring no individual adjustment. The present invention has another object of providing a method for manufacturing such an angular velocity sensor.

SUMMARY OF THE INVENTION

An angular velocity sensor of the present invention includes a tuning fork vibrator having two arms and a base to support the two arms together. It also includes a drive unit formed on a main surface of each of the two arms in order to drive each of the two arms in the X-axis direction. It also includes a detection unit formed on a main surface of each of the two arms in order to detect the vibration of each of the two arms in the Z-axis direction based on an angular velocity $\Omega$ applied around the Y-axis. The detection unit is made by forming a bottom electrode on the main surface of each of the two arms, and by further forming a piezoelectric film and a top electrode in this order on the bottom electrode. The main surface of each of the two arms and a tilted side surface adjacent to the main surface cross each other at an acute angle. This allows the center of at least the top electrode of the detection unit to be shifted from the center of the main surface of each of the two arms to the side opposite to the tilted side surface. As a result, the angular velocity sensor can control the generation of signals which are unnecessary to the angular velocity sensor and are generated on the sensing electrodes when the tuning fork is made to vibrate in the X-axis direction, while maintaining the advantages of being thin and requiring no individual adjustment of the vibrator.

In an angular velocity sensor of another aspect of the present invention, the main surface of each of the two arms having the detection unit thereon and a tilted side surface adjacent to the main surface cross each other at an acute angle. As a result, the center of at least the top electrode of the detection unit can be shifted by a specified amount towards the side surface opposite to the tilted side surface, that is, towards the vertical side surface in accordance with the degree of tilt of the tilted side surface. This improves the control of the generation of signals which are unnecessary to the angular velocity sensor and are generated on the sensing electrodes.

An angular velocity sensor of another aspect of the present invention includes a tuning fork vibrator having two arms and a base to support the two arms together. It also includes a drive unit formed on a main surface of each of the two arms in order to drive each of the two arms in the X-axis direction. It also includes a detection unit formed on a main surface of each of the two arms in order to detect the vibration of each of the two arms in the Z-axis direction based on an angular velocity applied around the Y-axis. The detection unit is made up of a bottom electrode formed on the main surface of each of the two arms, a piezoelectric film formed on the bottom electrode and a top electrode formed on the piezoelectric film. The main surface of each of the two arms having the detection unit thereon and a tilted side surface adjacent to the main surface cross each other at an obtuse angle. This allows the center of at least the top electrode of the detection unit to be shifted towards the tilted side surface. As a result, the angular velocity sensor can control the generation of signals which are unnecessary to the angular velocity sensor and are generated on the sensing electrodes when the tuning fork is made to vibrate in the X-axis direction, while maintaining the advantages of being thin and requiring no individual adjustment of the vibrator.

In an angular velocity sensor of another aspect of the present invention, the main surface of each of the two arms having the detection unit thereon and a tilted side surface adjacent to the main surface cross each other at an obtuse angle. The center of at least the top electrode of the detection unit is shifted by a specified amount from the center of the main surface towards the tilted side surface in accordance with the degree of tilt of the tilted side surface. This improves the control of the generation of signals which are unnecessary to the angular velocity sensor and are generated on the sensing electrodes.

In an angular velocity sensor of another aspect of the present invention, the drive units are made up of bottom electrodes formed on the main surface of each of the two arms across the center of the main surface, piezoelectric films formed on the bottom electrodes, and top electrodes formed on the piezoelectric films in such a manner as to be away from each other across the center of the main surface. This structure allows the drive units to be made of the same material as the detection units, so as to make the angular velocity sensor not only inexpensive but also easy to manage its properties.

In an angular velocity sensor of another aspect of the present invention, the drive units are made up of bottom electrodes formed away from each other across the center of the main surface of each of the two arms, piezoelectric films respectively formed on the bottom electrodes, and top electrodes respectively formed on the piezoelectric films. This structure allows the drive units to be made of the same material as the detection units, so as to make the angular velocity sensor not only inexpensive but also easy to manage its properties. This structure also improves the reliability when the tuning fork is made to vibrate in the X-axis direction.

In an angular velocity sensor of another aspect of the present invention, the tuning fork vibrator is formed by dry etching so as to perform high precision shape control.

In an angular velocity sensor of another aspect of the present invention, the tuning fork vibrator is made of a silicon-based material so as to have a large mechanical strength and to oscillate with a large amplitude.

An angular velocity sensor of another aspect of the present invention includes a tuning fork vibrator having two arms and a base to support the two arms together. It also includes a drive unit formed on a main surface of each of the two arms in order to drive each of the two arms in the X-axis direction. It also includes a detection unit formed on a main surface of each of the two arms in order to detect the vibration of each of the two arms in the Z-axis direction resulting from an angular velocity applied around the Y-axis. The drive unit is made up of a bottom electrode formed on the main surface, a piezoelectric film formed on the bottom electrode and a top electrode formed on the piezoelectric film. The main surface having the drive unit thereon and a tilted side surface adjacent to the main surface cross each other at an acute angle. This allows the amount of Y-axis deformation of the part of the drive unit that is on the tilted side surface side of the center of the main surface to be smaller than the amount of Y-axis deformation of the part of the drive unit that is on the side opposite to the tilted side surface side of the center of the main surface when the two arms are driven in the X-axis direction. As a result, the angular velocity sensor can control the unnecessary vibration generated on the sensing electrodes when the tuning fork is made to vibrate in the X-axis direction, while maintaining the advantages of being thin and requiring no individual adjustment. This results in the control of the generation of unnecessary signals.

In an angular velocity sensor of another aspect of the present invention, the drive units are made up of bottom electrodes formed on the main surface of each of the two arms across the center of the main surface, piezoelectric films formed on the bottom electrodes, and top electrodes formed on the piezoelectric films in such a manner as to be away from each other across the center of the main surface. This structure allows the angular velocity sensor to be not only inexpensive but also easy to manage its properties.

In an angular velocity sensor of another aspect of the present invention, the drive units are made up of bottom electrodes formed away from each other across the center of the main surface of each of the two arms, piezoelectric films respectively formed on the bottom electrodes, and top electrodes respectively formed on the piezoelectric films. This structure allows the angular velocity sensor to be not only inexpensive but also easy to manage its properties. This structure also improves the reliability in making the tuning fork vibrate in the X-axis direction.

In an angular velocity sensor of another aspect of the present invention, the main surface of each of the two arms having the drive units thereon and a tilted side surface adjacent to the main surface cross each other at an acute angle. As a result, the top electrode that is formed on the tilted side surface side of the center of the main surface of each of the two arms can be smaller in width in the X-axis direction than the top electrode that is formed on the side opposite to the tilted side surface side of the center of the main surface. In addition, both the top electrodes can have an equal center position and an equal length in the Y-axis direction so as to make the design of the angular velocity sensor easy and quick.

An angular velocity sensor of another aspect of the present invention includes a tuning fork vibrator having two arms and a base to support the two arms together. It also includes a drive unit formed on a main surface of each of the two arms in order to drive each of the two arms in the X-axis direction. It also includes a detection unit formed on a main surface of each of the two arms in order to detect the vibration of each of the two arms in the Z-axis direction based on an angular velocity applied around the Y-axis. The drive unit is made up of a bottom electrode formed on the main surface of each of the two arms, a piezoelectric film formed on the bottom electrode and a top electrode formed on the piezoelectric film. The main surface of each of the two arms having the drive unit thereon and a tilted side surface adjacent to the main surface cross each other at an obtuse angle. This allows the amount of Y-axis deformation of the part of the drive unit that is on the tilted side surface side of the center of the main surface to be larger than the amount of Y-axis deformation of the part of the drive unit that is on the side opposite to the tilted side surface side of the center of the main surface when the two arms are driven in the X-axis direction. This achieves an angular velocity sensor which is thin and requires no individual adjustment. The angular velocity sensor can control the unnecessary vibration generated on the sensing electrodes when the tuning fork is made to vibrate in the X-axis direction, and also control the generation of signals unnecessary to the angular velocity sensor.

In an angular velocity sensor of another aspect of the present invention, the drive units are provided with bottom electrodes formed on the main surface of each of the two arms across the center of the main surface. The drive units are further provided with piezoelectric films formed on the bottom electrodes, and top electrodes formed on the piezoelectric films in such a manner as to be away from each other across the center of the main surface. This allows the angular velocity sensor to be not only inexpensive but also easy to manage its properties.

In an angular velocity sensor of another aspect of the present invention, the drive units are provided with bottom electrodes formed away from each other across the center of the main surface of each of the two arms. The drive units are further provided with piezoelectric films respectively formed on the bottom electrodes, and top electrodes respectively formed on the piezoelectric films. This structure allows the angular velocity sensor to be not only inexpensive but also easy to manage its properties. This structure also improves the reliability in making the tuning fork vibrate in the X-axis direction.

In an angular velocity sensor of another aspect of the present invention, the main surface of each of the two arms having the drive units thereon and a tilted side surface adjacent to the main surface cross each other at an obtuse angle. Furthermore, the top electrode that is formed on the tilted side surface side of the center of the main surface of each of the two arms is made larger in width in the X-axis direction than the top electrode that is formed on the side opposite to the tilted side surface side of the center of the main surface. In addition, both the top electrodes can have an equal center position and an equal length in the Y-axis direction so as to make the design of the angular velocity sensor easy.

In an angular velocity sensor of another aspect of the present invention, the tuning fork vibrator is formed by dry etching. This improves the form accuracy of the angular velocity sensor.

In an angular velocity sensor of another aspect of the present invention, the tuning fork vibrator is made of a silicon-based material so as to have a large mechanical strength and to oscillate with a large amplitude.

In an angular velocity sensor of another aspect of the present invention, the detection unit is made up of a bottom electrode formed on the main surface of each of the two arms, a piezoelectric film formed on the bottom electrode and a top electrode formed on the piezoelectric film. This structure allows the drive units to be made of the same material as the detection units, so as to make the angular velocity sensor not only inexpensive but also easy to manage its properties.

A method for manufacturing an angular velocity sensor of the present invention is intended for an angular velocity sensor including a tuning fork vibrator having two arms and a base to support the two arms together; a drive unit formed on a main surface of each of the two arms in order to drive each of the two arms in an X-axis direction; and a detection unit formed on the main surface of each of the two arms in order to detect the vibration of each of the two arms in the Z-axis direction resulting from an angular velocity applied around the Y-axis. The method includes a process of forming a bottom electrode on the XY surface of a substrate, and a process of forming a piezoelectric film on the bottom electrode. It further includes a process of forming a top electrode on the piezoelectric film, and process of forming the drive unit and the detection unit from the bottom electrode, the piezoelectric film and the top electrode. It further includes a process of forming the tuning fork vibrator by dry etching the substrate in such a manner that the Y-axis direction of the two arms coincides with the Y-axis direction of the substrate. As the incident angle of the plasma used for the dry etching on the YZ surface of the substrate gets larger, the center of at least the top electrode of the detection unit formed on the main surface is made to be shifted by a specified amount from the center of the main surface towards the X-axis edge of the substrate.

According to the aforementioned manufacturing method, it is possible, at the time of forming the detection units, to collectively eliminate unnecessary signals which are different depending on the angular velocity sensor, and which are generated on the sensing electrodes at the time of vibrating arms having different cross sections depending on where in the substrate the tuning fork vibrator is formed.

BRIEF DESCRIPTION OF THE DRAWINGS

FIG. 1A is a plan view showing deformation of a tuning fork vibrator of an angular velocity sensor according to a first embodiment of the present invention when it is driven in the X-axis direction.

FIG. 1B is a side view of FIG. 1A.

FIG. 8A is a manufacturing process of the conventional angular velocity sensor, showing a process of forming openings in a silicon substrate in an enlarged view of the area inside circle "P" of FIG. 7.

FIG. 8B is a manufacturing process of the conventional angular velocity sensor, showing a process of forming a protective film, which comes after the process of FIG. 8A.

FIG. 8C is a manufacturing process of the conventional angular velocity sensor, showing a process of etching the openings, which comes after the process of FIG. 8B.

FIG. 8D is a manufacturing process of the conventional angular velocity sensor, showing a process of forming a protective film, which comes after the process of FIG. 8C.

FIG. 8E is a manufacturing process of the conventional angular velocity sensor, showing a process of etching the openings, which comes after the process of FIG. 8D.

FIG. 8F is a manufacturing process of the conventional angular velocity sensor, showing a process of forming a protective film, which comes after the process of FIG. 8E.

FIG. 8G is a manufacturing process of the conventional angular velocity sensor, showing a state where arms of tuning fork vibrators are separated from the wafer.

FIG. 9A is a plan view showing deformation of a tuning fork vibrator of an angular velocity sensor manufactured by the method of the present invention when it vibrates in the X-axis direction.

FIG. 9B is a side view of FIG. 9A.

FIG. 10 is a cross sectional view taken along the line C-C shown in FIG. 9A.

Figure 2:
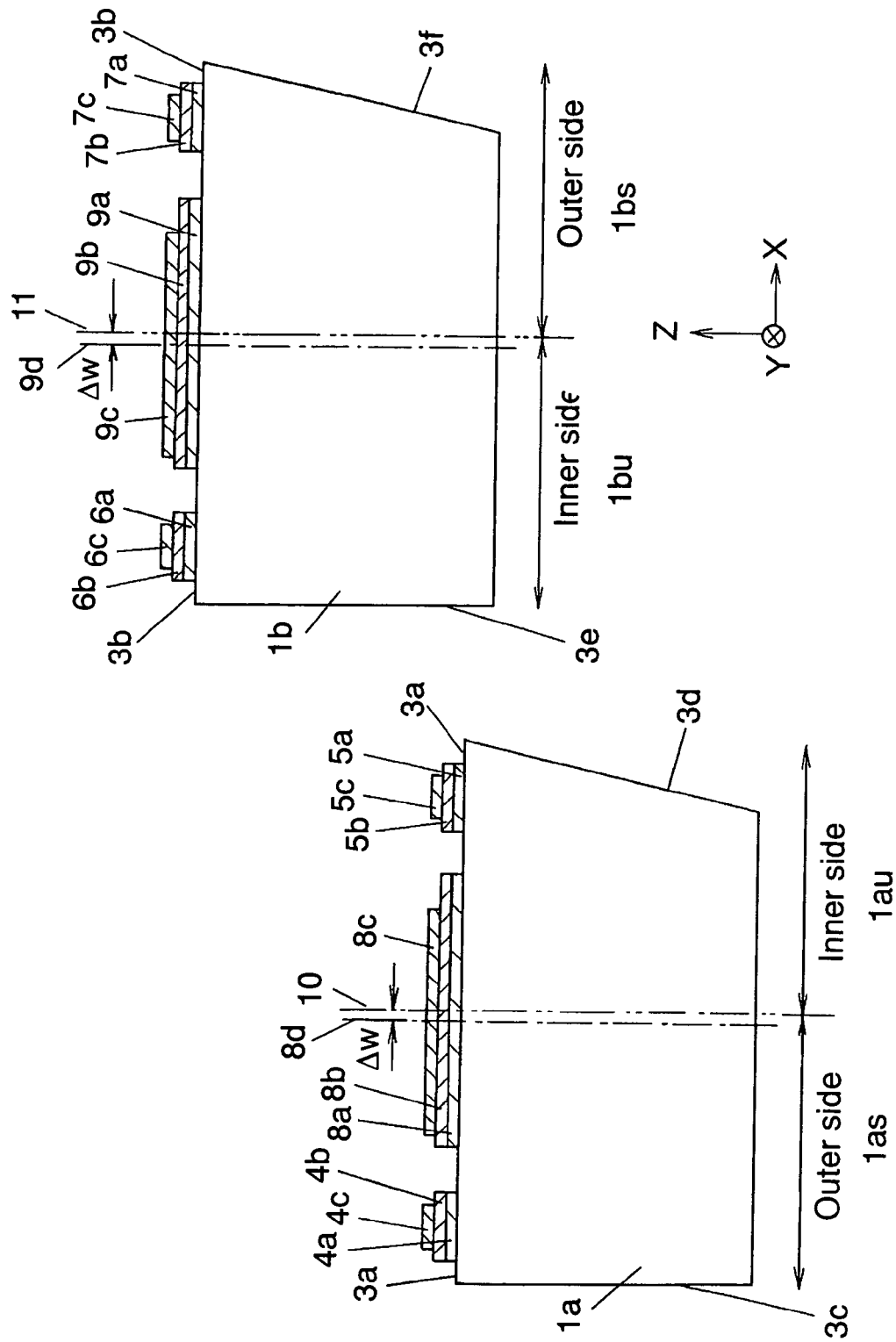
FIG. 2 is a cross sectional view taken along the line A-A of FIG. 1A.

REFERENCE MARKS IN THE DRAWINGS 1a, 1b arm
2 base
3a, 3b main surface
3c, 3d, 3e, 3f side surface
4, 5, 6, 7 drive unit
4a, 5a, 6a, 7a, 8a, 9a bottom electrode
4b, 5b, 6b, 7b, 8b, 9b piezoelectric film
4c, 5c, 6c, 7c, 8c, 9c top electrode
8, 9 detection unit
8d, 9d, 10, 11 center
20 wafer
21 Pt-Ti film
22 PZT film
23 Au/Ti film
24, 25, 26 resist film

DETAILED DESCRIPTION OF PREFERRED EMBODIMENT

An embodiment of the present invention will be described as follows with reference to drawings.

Figure 3:
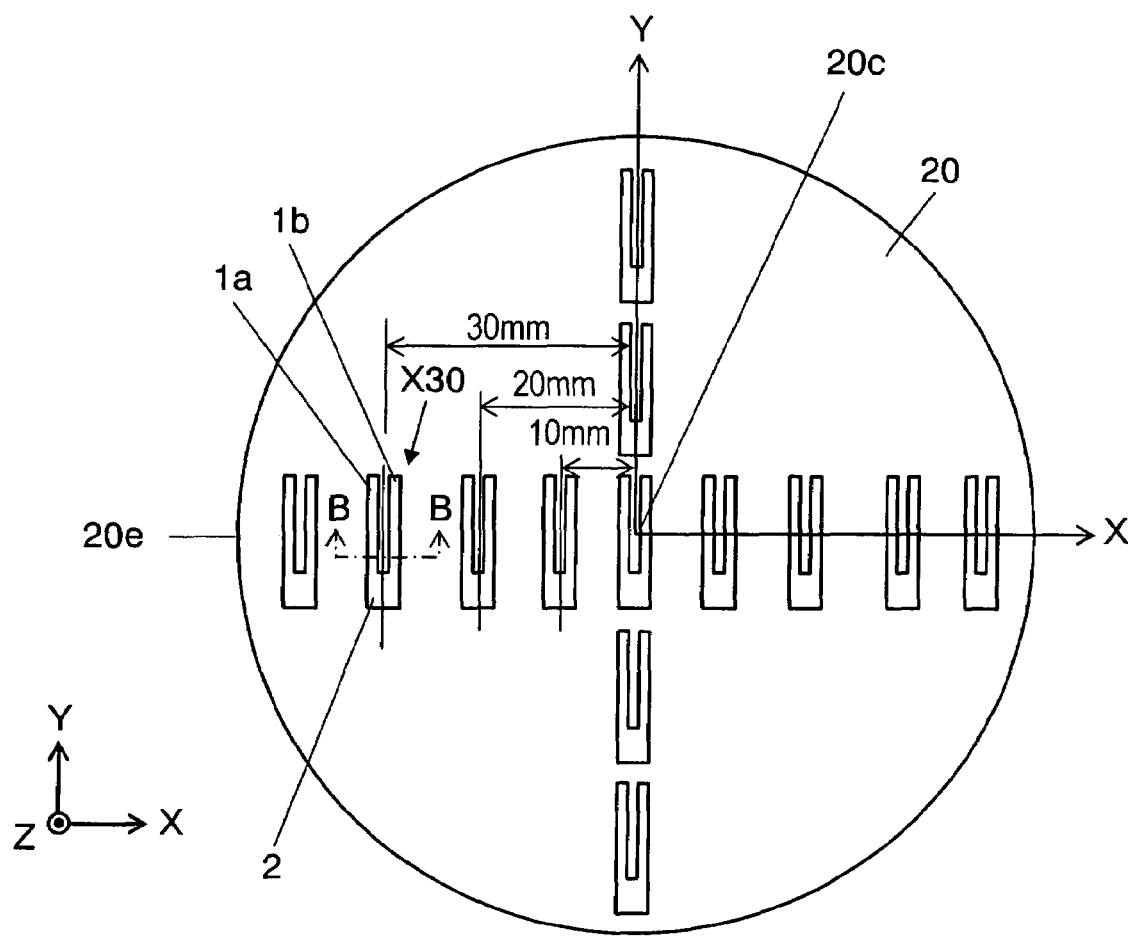
FIG. 3 is an arrangement of tuning fork vibrators formed in a wafer according to the first embodiment.
Figure 4:
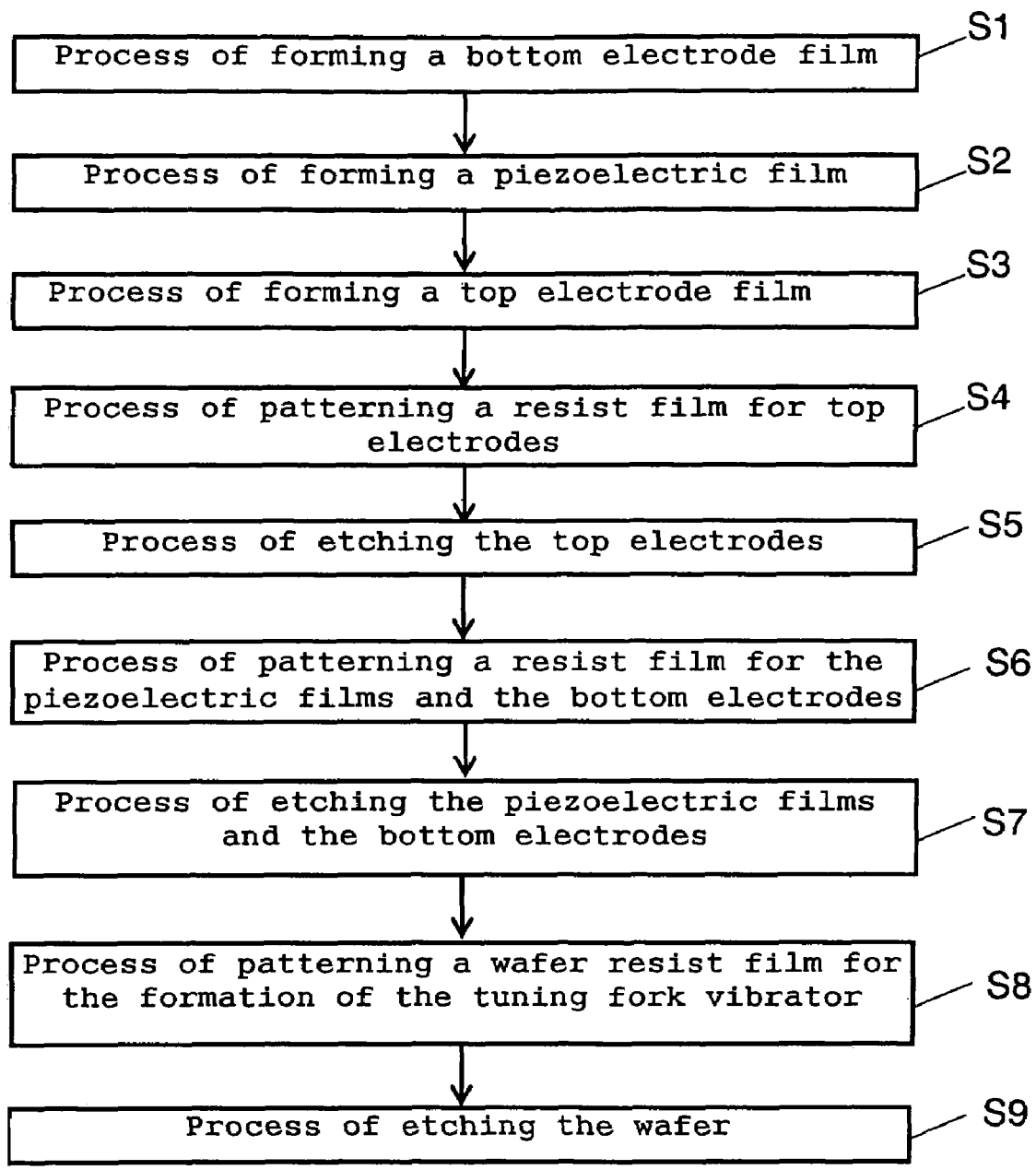
FIG. 4 is a flowchart showing the manufacturing processes on the cross section taken along the line B-B shown in FIG. 3.

FIG. 1A is a plan view showing a tuning fork vibrator of an angular velocity sensor according to an embodiment of the present invention when it is driven in the X-axis direction; FIG. 1B is a side view of FIG. 1A; FIG. 2 is a cross sectional view taken along the line A-A of FIG. 1A; and FIG. 3 is an arrangement of tuning fork vibrators formed in the wafer according to the first embodiment. FIG. 4 is a flowchart showing the manufacturing processes on the cross section taken along the line B-B shown in FIG. 3. FIG. 5 shows manufacturing processes of the angular velocity sensor according to the present invention. FIG. 6 is a characteristic view to show the relationship between the positions of the tuning fork vibrators formed in the wafer in the X-axis direction by the manufacturing processes and the unnecessary signals generated on the sensing electrodes of the tuning fork vibrator.

The following is a description of the structure of an angular velocity sensor of the present embodiment.

In FIG. 1A, tuning fork vibrator 1 is made up of arm 1a, arm 1b and base 2. Arms 1a and 1b are connected to each other and supported by base 2. Arms 1a and 1b are provided with main surface 3a and main surface 3b, respectively. Arm 1a has drive unit 4 and drive unit 5 on main surface 3a thereof with detection unit 8 therebetween. Arm 1b has drive unit 6 and drive unit 7 on main surface 3b thereof with detection unit 9 therebetween.

FIG. 1B is a side view of FIG. 1A, and can show arms 1a and 1b, and drive units 5 and 7.

FIG. 2 is a cross sectional view taken along the line A-A of FIG. 1A. FIG. 2 shows a cross section of arm 1a on its left side, and a cross section of arm 1b on its right side.

Arm 1a is provided with side surface 3c approximately perpendicular to main surface 3a, and side surface 3d tilted from main surface 3a. How to form side surfaces 3c and 3d will be described later with reference to FIG. 5.

Going back to the description of arm 1a, arm 1a is provided first with bottom electrode 4a on outer side 1as of main surface 3a. On bottom electrode 4a, piezoelectric film 4b subjected to a polarization treatment in the direction perpendicular to its film surface and top electrode 4c are formed in this order. Drive unit 4 shown in FIG. 1A is made up of bottom electrode 4a, piezoelectric film 4b and top electrode 4c shown in FIG. 2. Arm 1a is also provided first with bottom electrode 5a on inner side 1au of main surface 3a. On bottom electrode 5a, piezoelectric film 5b subjected to a polarization treatment in the direction perpendicular to its film surface, and top electrode 5c are formed in this order. Drive unit 5 shown in FIG. 1A is made up of bottom electrode 5a, piezoelectric film 5b, and top electrode 5c shown in FIG. 2.

In FIG. 2, bottom electrode 8a is formed on main surface 3a of arm 1a in such a manner as to be symmetric with respect to center 10 of main surface 3a. On bottom electrode 8a, piezoelectric film 8b subjected to a polarization treatment in the direction perpendicular to its film surface, and top electrode 8c are formed in this order. It should be noted that top electrode 8c is made symmetric not with respect to center 10, but with respect to center 8d which is away from center 10 by distance ΔW. In other words, center 8*d* of top electrode 8*c* is shifted to the side surface 3*c* side by distance ΔW. Bottom electrode 8*a*, piezoelectric film 8*b* and top electrode 8*c* make up detection unit 8 shown in FIG. 1A.

Similarly, arm 1*b* shown on the right side of FIG. 2 is provided with side surface 3*e* approximately perpendicular to main surface 3*b*, and side surface 3*f* tilted from main surface 3*b*. How to form side surfaces 3*e* and 3*f* will be described later with reference to FIG. 5 in the same manner as side surface 3*c* and 3*d*.

Arm 1*b* is provided first with bottom electrode 6*a* on inner side 1*bu* of main surface 3*b*. On bottom electrode 6*a*, piezoelectric film 6*b* subjected to a polarization treatment in the direction perpendicular to its film surface and top electrode 6*c* are formed in this order. Bottom electrode 6*a*, piezoelectric film 6*b* and top electrode 6*c* make up drive unit 6 shown in FIG. 1A.

Arm 1*b* is also provided first with bottom electrode 7*a* on outer side 1*bs* of main surface 3*b*. On bottom electrode 7*a*, piezoelectric film 7*b* subjected to a polarization treatment in the direction perpendicular to its film surface, and top electrode 7*c* are formed in this order. Bottom electrode 7*a*, piezoelectric film 7*b* and top electrode 7*c* make up drive unit 7 shown in FIG. 1A.

Bottom electrode 9*a* is formed on main surface 3*b* of arm 1*b* in such a manner as to be symmetric with respect to center 11. On bottom electrode 9*a*, piezoelectric film 9*b* subjected to a polarization treatment in the direction perpendicular to its film surface and top electrode 9*c* are formed in this order. It should be noted that top electrode 9*c* is made symmetric not with respect to center 11, but with respect to center 9*d* which is away from center 11 by distance ΔW. In other words, center 9*d* of top electrode 9*c* is shifted to the vertical side surface 3*e* side by distance ΔW. Detection unit 9 shown in FIG. 1A is made up of bottom electrode 9*a*, piezoelectric film 9*b* and top electrode 9*c*.

The following is a description about how to drive the tuning fork vibrator of the angular velocity sensor in the X-axis direction. In FIG. 2, top electrodes 4*c* and 7*c* are applied with drive voltages of the same phase so as to shrink piezoelectric film 4*b* on main surface 3*a* of arm 1*a*, and piezoelectric film 7*b* on main surface 3*b* of arm 1*b* in the Y-axis direction. On the other hand, top electrodes 5*c* and 6*c* are applied with drive voltages having a phase opposite to the drive voltages to be applied on top electrodes 4*c* and 7*c* so as to stretch piezoelectric films 5*b* and 6*b* in the Y-axis direction. As a result, as shown in FIG. 1A, arms 1*a* and 1*b* vibrate outwards from each other in the X-axis direction.

Arms 1*a* and 1*b*, which are provided with side surfaces 3*d* and 3*f* tilted as shown in FIG. 2, are made to vibrate in the X-axis direction and also to vibrate opposite to each other in the Z-axis direction. As a result, piezoelectric film 8*b* as a component of the detection unit is applied with the stress to stretch it in the Z-axis direction. Piezoelectric film 9*b* as a component of the other detection unit is applied with the stress to shrink it in the Z-axis direction. These stresses cause top electrodes 8*c* and 9*c* as components of the respective detection units to have approximately the same charge with polarities opposite to each other. Thus, just driving the tuning fork vibrator in the X-axis direction causes top electrodes 8*c* and 9*c* to have electric charges (unnecessary signals) which make it seem as if an angular velocity were applied around the Y axis, although it is not applied.

As described above, centers 8*d* and 9*d* of top electrodes 8*c* and 9*c* are shifted by distance ΔW from centers 10 and 11 of main surfaces 3*a* and 3*b*, respectively, in the directions opposite to tilted side surfaces 3*d* and 3*f*, that is, to the vertical side surface 3*c* and 3*e* sides. This can control unnecessary signals generated on top electrode 8*c* and 9*c*. In general, the size of ΔW to be shifted can be determined in accordance with the size of the unnecessary signals generated on top electrodes 8*c* and 9*c* in view of the degree of the tilt of side surfaces 3*d* and 3*f* which have been dry etched.

The following is a description of the mechanism to control the unnecessary signals. Top electrode 8*c* has the following three possible events.

Firstly, when the tuning fork vibrator is driven in the X-axis direction, arm 1*a* is bent in the Z-axis direction so that piezoelectric film 8*b* is stretched in the Z-axis direction. As a result, top electrode 8*c* has positive charges (A=+100, for example).

Secondly, when the tuning fork vibrator is driven in the X-axis direction, arm 1*a* is bent outwards in the X-axis direction. This bending applies a stress on the part of piezoelectric film 8*b* that is on outer side 1*as*, or outside center 10 so as to shrink the part in the X-axis direction. As a result, the part of top electrode 8*c* that is formed on piezoelectric film 8*b* has negative charges (B=−1000, for example). Top electrode 8*c* is made wider in width than the conventional ones by ΔW. Thirdly, when the tuning fork vibrator is driven in the X-axis direction, arm 1*a* is bent outwards in the X-axis direction. This bending applies a stress on the part of piezoelectric film 8*b* that is on inner side 1*au* or inside center 10 so as to stretch the part in the X-axis direction. As a result, the part of top electrode 8*c* that corresponds to the part of piezoelectric film 8*b* (made shorter in width than the conventional ones by ΔW) has positive charges (C=+900, for example).

In conclusion, when the tuning fork vibrator is driven in the X-axis direction, the total of the charges on top electrode 8*c* is A+B+C=(+100)+(−1000)+(+900)=0, thus reducing the unnecessary signals on the sensing electrodes.

Similar to top electrode 8*c*, top electrode 9*c* of detection unit 9 on the arm 1*b* side has the following three possible events.

Firstly, when the tuning fork vibrator is driven in the X-axis direction, arm 1*b* is bent in the Z-axis direction so that piezoelectric film 9*b* is shrunk in the Z-axis direction. As a result, top electrode 9*c* has negative charges (D=−100, for example).

Secondly, when the tuning fork vibrator is driven in the X-axis direction, arm 1*b* is bent outwards in the X-axis direction. This bending applies a stress on the part of piezoelectric film 9*b* that is on inner side 1*bu*, or inside center 11 so as to stretch the part in the X-axis direction. As a result, the part of top electrode 9*c* (that is made wider in width than the conventional ones by ΔW) has positive charges (E=+1000, for example).

Thirdly, when the tuning fork vibrator is driven in the X-axis direction, arm 1*b* is bent outwards in the X-axis direction. This bending applies a stress on the part of piezoelectric film 9*b* that is on outer side 1*bs* or outside center 11 so as to shrink the part in the X-axis direction. As a result, the part of top electrode 9*c* (that is made shorter in width than the conventional ones by ΔW) has negative charges (F=−900, for example).

In conclusion of arm 1*b*, when the tuning fork vibrator is driven in the X-axis direction, the total of the charges on top electrode 9*c* is D+E+F=(−100)+(+1000)+(−900)=0, thus reducing the unnecessary signals on the sensing electrodes.

The present invention described hereinbefore can be summarized as follows. Only the charges generated on top electrodes 8*c* and 9*c* are processed in a sensing circuit (unillustrated) based on the Coriolis force which causes arms 1*a* and 1*b* to bend in the Z-axis direction when angular velocity Ω is applied around the Y axis. This provides an angular velocity sensor that can output only angular velocity signals. Shifting top electrodes 8c and 9c by a specified amount in this manner can control the generation of the unnecessary signals on the sensing electrodes when the tuning fork vibrator is driven in the X-axis direction, thereby achieving a thin angular velocity sensor.

The following is a description of a method for manufacturing an angular velocity sensor according to the present embodiment. The description will be mainly focused on the tuning fork vibrator as its main component, and the drive units and detection units mounted on it with reference to FIGS. 3, 4 and 5.

In FIG. 3, a silicon wafer (hereinafter, simply referred to as wafer) 20 made of a silicon-based material is prepared as the substrate of the angular velocity sensor. A large number of arms 1a and 1b are arranged in wafer 20 in such a manner that their longitudinal direction coincided with, e.g. the Y-axis direction of wafer 20.

In FIG. 4, Step S1 is a process of forming a bottom electrode film, Step S2 is a process of forming a piezoelectric film, Step S3 is a process of forming a top electrode film, Step S4 is a process of patterning a resist film for the top electrodes, Step S5 is a process of etching the top electrodes, Step S6 is a process of patterning a resist film for the piezoelectric films and the bottom electrodes, Step S7 is a process of etching the piezoelectric films and the bottom electrodes, Step S8 is a process of patterning a wafer resist film for the formation of the tuning fork vibrator, and Step S9 is a process of etching the wafer.

FIGS. 5A-5I show one example of the formation of the tuning fork vibrator which is located at position X30, which is 30 mm from center 20c of wafer 20 in the -X-axis direction. When wafer 20 has a diameter of 4 inches (about 100 mm), the radius is about 50 mm, which means that the position of X30 (30 mm) is closer to end 20e than to center 20c of wafer 20.

Figure 5A:
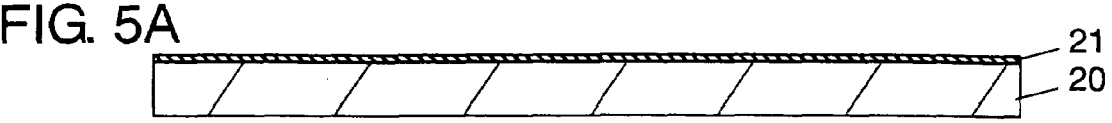
FIG. 5A is a manufacturing process of the angular velocity sensor according to the present invention, showing a process of forming a bottom electrode film.
Figure 6:
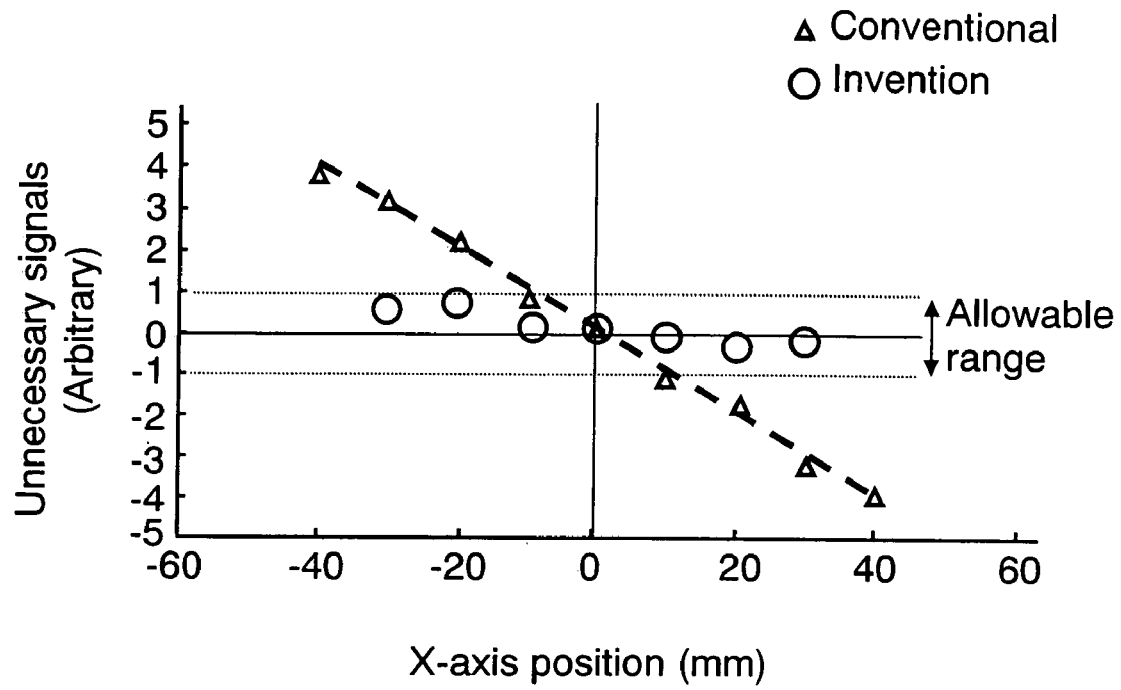
FIG. 6 is a characteristic view to show the relationship between the positions of the tuning fork vibrators formed in the wafer in the X-axis direction and the unnecessary signals of the angular velocity sensor of the present invention.

FIG. 5A corresponds to the process of forming the bottom electrode film of Step S1 shown in FIG. 4. As wafer 20, silicon having a diameter of about 4 inches and a thickness of 200 μm is set on an unillustrated deposition apparatus, and Pt-Ti film 21 as the bottom electrodes is deposited as thick as about 3000 Å.

Figure 5B:
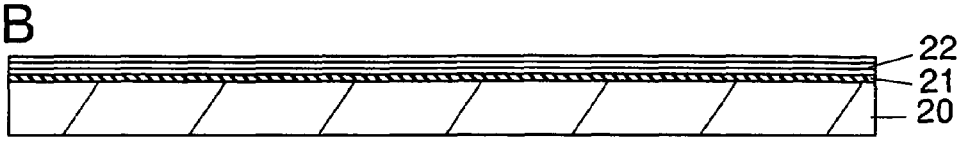
FIG. 5B is a manufacturing process of the angular velocity sensor, showing a process of forming a piezoelectric film.

FIG. 5B corresponds to the process of forming the piezoelectric film of Step S2 shown in FIG. 4. Wafer 20 with Pt-Ti film 21 deposited thereon is set on an unillustrated sputtering apparatus, and PZT film 22 as the piezoelectric films is formed as thick as about 2.5 μm by sputtering, which is a physical deposition process.

Figure 5C:
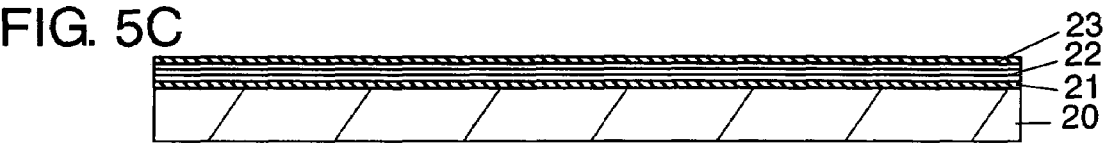
FIG. 5C is a manufacturing process of the angular velocity sensor, showing a process of forming a top electrode film.

FIG. 5C corresponds to the process of forming the top electrode film of Step S3 shown in FIG. 4. Wafer 20 provided with PZT film 22 is set in the sputtering apparatus, and Au/Ti film 23 having a thickness of 3000 Å as the top electrodes is formed by sputtering, which is a physical deposition process.

Figure 5D:
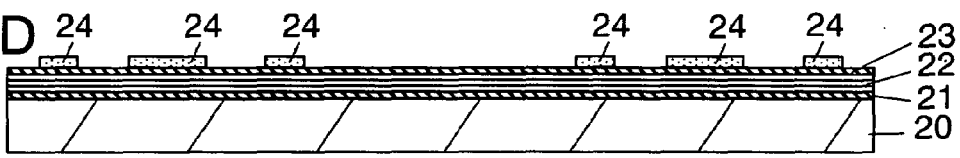
FIG. 5D is a manufacturing process of the angular velocity sensor, showing a process of patterning a resist film for top electrodes.

FIG. 5D corresponds to the process of patterning the resist film for the top electrodes of Step S4 shown in FIG. 4. Resist film 24 is applied on the entire surface of Au/Ti film 23, and is selectively patterned as a first resist film. Resist film 24 is patterned with first openings in order to correspond to drive units 4, 5, 6 and 7 and detection units 8 and 9 shown in FIG. 1. In this patterning, only the top electrodes are shifted by a specified amount in such a manner as to correspond to the size of the unnecessary signals given to detection units 8 and 9 by the bending generated in the Z-axis direction when the tuning fork is made to vibrate in the X-axis direction. The top electrodes of the drive units are formed on the conventional position without being shifted.

Figure 5E:
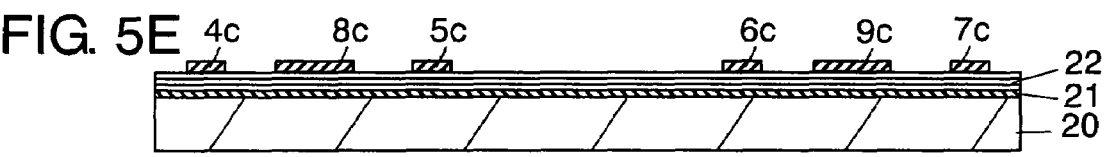
FIG. 5E is a manufacturing process of the angular velocity sensor, showing a process of etching the top electrodes.

FIG. 5E corresponds to the process of etching the top electrodes of Step S5 shown in FIG. 4. As shown in the previous process of FIG. 5D, wafer 20 provided with patterned resist film 24 is set in an unillustrated dry etching apparatus. While using resist film 24 as a mask, Au/Ti film 23 is subjected to an etching treatment. As a result, top electrodes 4c, 5c, 6c and 7c made of the Au/Ti film, which are components of drive units 4, 5, 6 and 7, respectively, are complete. At the same time, top electrodes 8c and 9c made of the Au/Ti film, which are components of detection units 8 and 9, respectively, are complete.

Figure 5F:
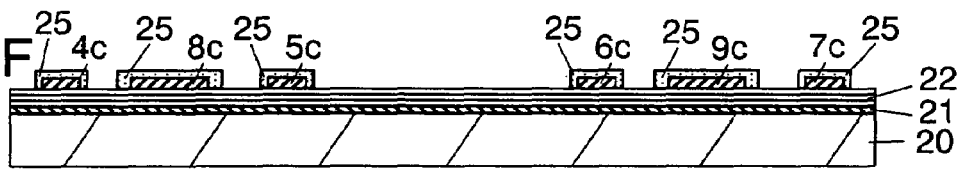
FIG. 5F is a manufacturing process of the angular velocity sensor, showing a process of patterning a resist film for the piezoelectric films and bottom electrodes.

FIG. 5F corresponds to the process of patterning the resist film for the piezoelectric films and the bottom electrodes of Step S6 shown in FIG. 4. The resist film is formed on PZT film 22 and top electrodes 4c, 5c, 6c, 7c, 8c and 9c, and is selectively etched to form resist film 25 as a second resist film. Resist film 25 is patterned with second openings to have a shape corresponding to drive units 4, 5, 6 and 7, and detection units 8 and 9 shown in FIG. 1.

Figure 5G:
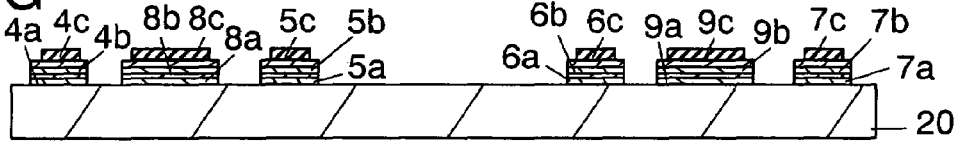
FIG. 5G is a manufacturing process of the angular velocity sensor, showing a process of etching the piezoelectric films and bottom electrodes.

FIG. 5G corresponds to the process of etching the piezoelectric films and the bottom electrodes of Step S7 shown in FIG. 4. Wafer 20 provided with resist film 25 having the second openings patterned in the previous process is set in the dry etching apparatus. Then, PZT film 22 and Pt-Ti film 21 are subjected to a second dry etching treatment via patterned resist film 25. This results in the formation of piezoelectric films 4b, 5b, 6b and 7b made of the PZT film, as well as bottom electrodes 4a, 5a, 6a and 7a made of the Pt-Ti film, which are components of drive units 4, 5, 6 and 7. This also results in the formation of piezoelectric films 8b and 9b made of the PZT film as well as bottom electrodes 8a and 9a made of the Pt-Ti film, which are components of detection units 8 and 9.

Figure 5H:
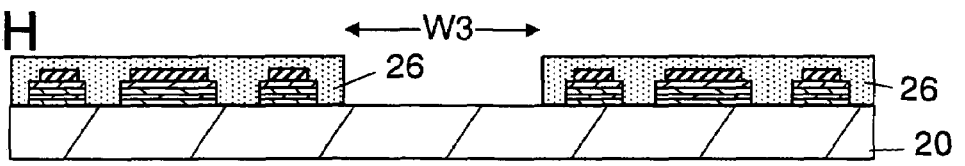
FIG. 5H is a manufacturing process of the angular velocity sensor, showing a process of patterning a resist film for the wafer.

FIG. 5H corresponds to the process of patterning a wafer resist film for the formation of the tuning fork vibrator of Step S8 shown in FIG. 4. Wafer 20 provided with drive units 4, 5, 6 and 7 and detection units 8 and 9 shown in FIG. 1 is entirely coated with an unillustrated resist film. After this, resist film 26 as a third resist film is patterned to have third opening W3 in such a manner that arms 1a and 1b have a spacing of, for example, 50 μm therebetween.

Figure 5I:
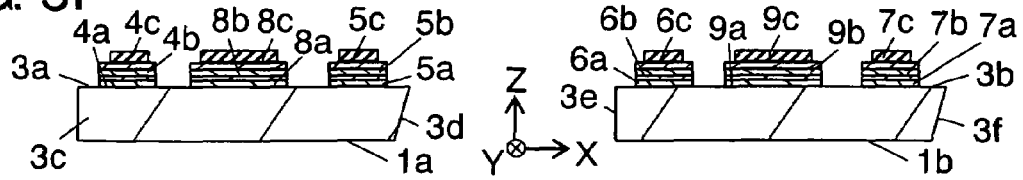
FIG. 5I is a manufacturing process of the angular velocity sensor, showing a process of etching the wafer.

FIG. 5I corresponds to the process of etching the wafer of Step S9 shown in FIG. 4. Wafer 20 provided with resist film 26 having the third opening patterned in the previous process of FIG. 5H is set in the unillustrated dry etching apparatus. After this, wafer 20 is subjected to dry etching for 8 seconds at an rf power of 2500 W, using, e.g. SF6 gas. Later, the SF6 gas is replaced with CF4 gas, and an rf power of 1800 W is applied for 3 seconds to form a protective film (unillustrated). In the present invention, the application of dry etching and the formation of the protective film are made one set, and the third dry etching treatment repeats the set 240 times. After the third dry etching treatment, side surface 3d (see FIG. 2) of arm 1a is made to be tilted in the travel direction of the plasma. Outside surface 3c of arm 1a can be made approximately perpendicular to one main surface of wafer 20.

Side surface 3f of arm 1b is also made to be tilted in the travel direction of the plasma. Inside surface 3e of arm 1b is made approximately perpendicular to one main surface of wafer 20.

Thus, FIGS. 5A-5I have shown one example of manufacturing an angular velocity sensor including the tuning fork vibrator located in position X30, which is 30 mm away from the center of wafer 20 shown in FIG. 3 in the -X-axis direction. The above description holds true for tuning fork vibrators located in other positions. For example, in an angular velocity sensor including a tuning fork vibrator located in a position which is 20 mm away from the center of wafer 20 shown in FIG. 3 in the -X-axis direction, the travel direction of the plasma becomes closer to be perpendicular to the surface of wafer 20. Consequently, the specified shift amount ΔW of the parts corresponding to top electrodes 8*c* and 9*c* in the first openings formed in resist film 24 as the first resist film is made smaller than in the case of 30 mm. In other words, the shift amount ΔW is determined in view of the travel direction of the plasma and the irradiation angle.

When wafer 20 is subjected to dry etching, the degree of tilt of the side surface of an arm of the tuning fork vibrator is uniquely determined by the travel direction of the plasma, that is, the irradiation angle of the plasma with respect to the YZ surface of wafer 20. The larger the incident angle of the plasma onto the YZ surface, the larger the degree of tilt of the side surface of an arm. In other words, the larger the incident angle of the plasma onto the YZ surface, main surface 3*b* and side surface 3*f* cross each other at a smaller acute angle. This results in an increase in the generation amount of the unnecessary signals on the sensing electrodes when the tuning fork vibrator is driven in the X-axis direction. Thus, the specified shift amount ΔW is predetermined in accordance with the degree of tilt. It is necessary to control the shift amount ΔW per degree of tilt of an arm side surface, by setting it to ΔW=10 μm, for example.

In FIG. 6, the horizontal axis indicates the distance (mm) from the center of wafer 20 in the X-axis direction. The vertical axis indicates the amount of signals which are unnecessary to the angular velocity sensor and are generated on the sensing electrodes when the tuning fork vibrator is driven in the X-axis direction. The vertical scale is in arbitrary units; "1" on the scale can be 100 mv or 1000 mv, or can be 200 mv or 2000 mv. The size on this scale does not necessarily show the size of the signal appearing on the sensing electrodes. It is, for example, possible to indicate the size of a signal appearing on the sensing electrodes as the size amplified at a prescribed amplification degree. In any case, the scale is in arbitrary units because the size of the absolute value of unnecessary signals cannot be determined uniquely.

Figure 7:
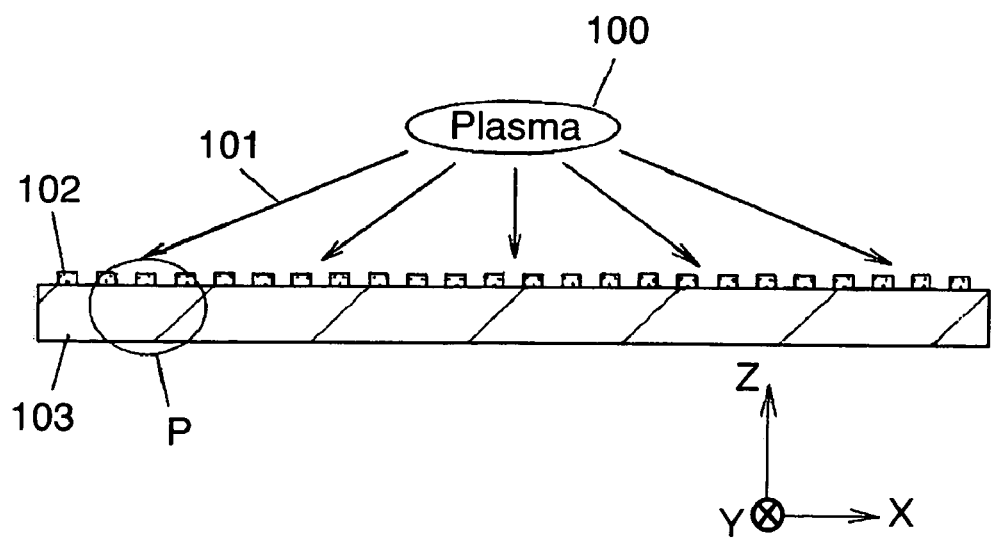
FIG. 7 is a schematic view showing a method for manufacturing a tuning fork vibrator for a conventional angular velocity sensor.
Figure 11:
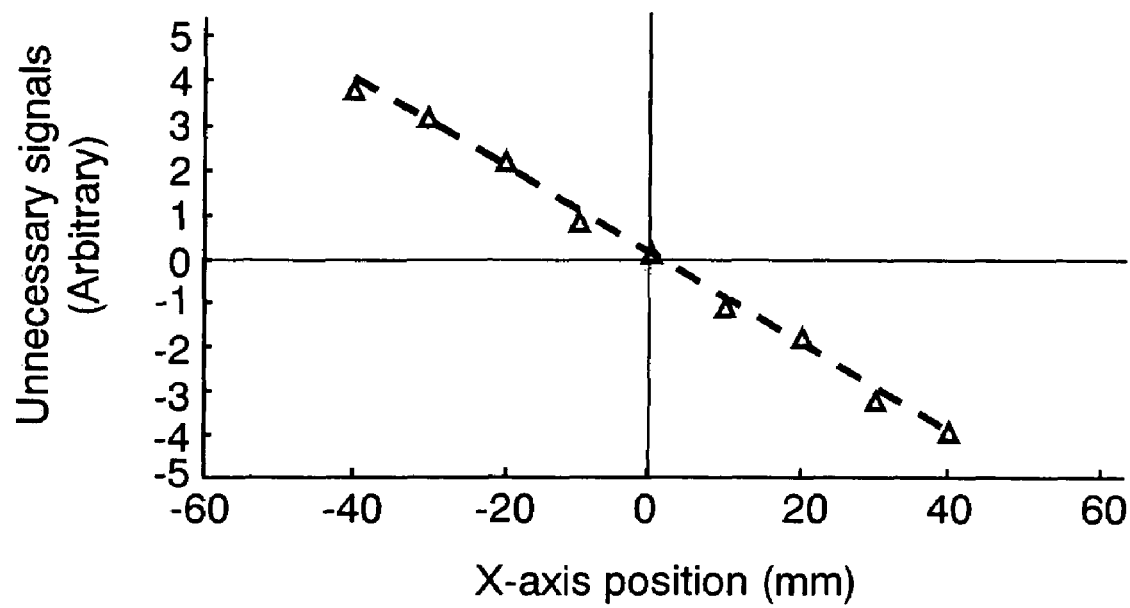
FIG. 11 is a characteristic view to show the relationship between the positions of the tuning fork vibrators formed in the wafer in the X-axis direction and the unnecessary signals of the angular velocity sensors.

FIG. 6 includes the cases of both the present invention (circles) and the conventional art (triangles) for comparison. More specifically, FIG. 6 includes the values of signals which are unnecessary to the angular velocity sensor and are generated on the sensing electrodes when the tuning fork vibrator that is manufactured by the conventional dry etching process using wafer 103 shown in FIG. 7 is driven in the X-axis direction.

It has been found that when the unnecessary signals have an allowable range from plus 1 to minus 1 as shown in FIG. 6, the amount of the unnecessary signals generated on the sensing electrodes in a desired angular velocity sensor is within an acceptable value in the range of ±30 mm from the center of wafer 20 in the X-axis direction.

In the present embodiment, the top electrodes are dry etched by forming a resist film which is for the formation of the top electrodes as components of the detection units and which has openings shifted in a specified direction by a specified amount in view of the inclination of the travel direction of the plasma emitted from the plasma source. This makes the amount of the unnecessary signals generated on the sensing electrodes in a desired angular velocity sensor to be within the acceptable value in the range of, e.g. ±30 mm from the center of wafer 20 in the X-axis direction.

However, the technical idea of the angular velocity sensor and the method for manufacturing the angular velocity sensor of the present invention are not limited to the arrangement of the top electrodes as components of the detection units and a method for forming them.

For example, the same effects can be obtained by shifting all of the bottom electrodes, the piezoelectric films and the top electrodes making up the detection units in a specified direction by a specified amount. In other words, the same effects can be obtained by shifting at least the top electrodes out of the bottom electrodes, the piezoelectric films and the top electrodes making up the detection units in a specified direction by a specified amount.

The present embodiment has described about the case where detection units 8 and 9 are formed on respective main surfaces 3*a* and 3*b* of arms 1*a* and 1*b*. Alternatively, the detection units can be formed on the other main surfaces opposed to main surfaces 3*a* and 3*b*. In that case, these main surfaces and tilted side surfaces 3*d* and 3*f* adjacent to the other main surfaces cross each other at an obtuse angle. Therefore, opposite to the case where the detection units are formed on main surfaces 3*a* and 3*b*, as side surfaces 3*d* and 3*f* have a larger degree of tilt (a larger obtuse angle), at least the top electrodes of the detection units are more shifted towards tilted side surfaces 3*d* and 3*f* in accordance with the degree of tilt. This can control unnecessary signals generated on the sensing electrodes.

In the case described in the present embodiment, each drive unit and each detection unit is made up of a bottom electrode, a piezoelectric film and a top electrode stacked in this order. However, this is not necessarily the only structure that is acceptable. Alternatively, structures with electrostatic driving, electrostatic detection or the like are possible. However, it would be preferable that each drive unit and each detection unit be made up of a bottom electrode, a piezoelectric film and a top electrode in view of the performance, reliability and price of the angular velocity sensor required from the market.

In the case described in the present embodiment, the wafer used as the substrate is made of silicon, but this is not the only material that is acceptable. Instead of silicon, various other materials such as diamond, fused silica, alumina and GaAs can be adopted as the substrate.

In the case described in the present embodiment, the detection units are shifted in a specified direction by a specified amount in view of the inclination of the travel direction of the plasma emitted from the plasma source, but this is not the only way that is acceptable. For example, in FIGS. 1 and 2, detection units 8 and 9 may be made symmetric with respect to centers 10 and 11 of respective main surfaces 3*a*, 3*b*; and bottom electrodes 4*a*, 5*a* and piezoelectric film 4*b*, 5*b* as components of drive units 4 and 5, respectively may be made symmetric with respect to center 10 of main surface 3*a*.

Alternatively, bottom electrodes 6*a*, 7*a* and piezoelectric films 6*b*, 7*b* as components of drive units 6 and 7, respectively, can be made symmetric with respect to center 11 of main surface 3*b*. Further alternatively, top electrodes 4*c*, 5*c*, 6*c* and 7*c* as components of drive units 4, 5, 6 and 7 can be made to have nearly the same center position and nearly the same length as each other in the Y-axis direction so that top electrodes 5*c* and 7*c* can be smaller in width in the X-axis direction than top electrodes 4*c* and 6*c* in accordance with the size of the unnecessary signals generated on the sensing electrodes when the tuning fork vibrator is driven in the X-axis direction (the size of the acute angle formed between main surfaces 3*a*, 3*b* and tilted side surfaces 3*d*, 3*f* adjacent to main surfaces 3*a*, 3*b*, respectively). In these structures, the unnecessary vibration caused on the sensing electrodes can be reduced so as to control signals which are unnecessary to the angular velocity sensor and are generated on the sensing electrodes.

In the case described in the present embodiment, drive units 4, 5, 6 and 7 are formed on main surfaces 3*a* and 3*b* of arms 1a and 1b. Alternatively, however, the drive units can be formed on the other main surfaces opposed to main surfaces 3a and 3b. In that case, these main surfaces and tilted side surfaces 3d and 3f adjacent to the other main surfaces cross each other at an obtuse angle. Therefore, the unnecessary vibration caused on the sensing electrodes can be reduced by making at least the top electrodes of the drive units on the tilted side surfaces 3d and 3f side larger in width than at least the top electrodes of the drive units on the side opposite to tilted side surfaces 3d and 3f, as side surfaces 3d and 3f have a larger degree of tilt (a larger obtuse angle) opposite to the case where the detection units are formed on main surfaces 3a and 3b. This can control the signals which are generated on the sensing electrodes and are unnecessary to the angular velocity sensor.

The mechanism to control the unnecessary signals generated on the sensing electrodes will be described in brief, using arm 1b shown in FIGS. 1 and 2. The presence of tilted side surface 3f shown in FIG.2 causes arm 1b to bend in the Z-axis direction as shown in FIG. 1B when the tuning fork vibrator is driven in the X-axis direction. As a result, the sensing electrodes have signals unnecessary to the angular velocity sensor. This bending in the Z-axis direction could be eliminated by increasing the stretching force of piezoelectric film 6b of drive unit 6 in the Y-axis direction so as to decrease the shrinking force of piezoelectric film 7b of drive unit 7 in the Y-axis direction.

In order to achieve this, the amount of the Y-axis deformation of drive unit 7 formed on the tilted side surface 3f side can be made smaller than the amount of the Y-axis deformation of drive unit 6 formed on the side surface 3e side in accordance with the size of the signals which are unnecessary to the angular velocity sensor and are generated on the sensing electrodes when the tuning fork vibrator is driven in the X-axis direction. Specific examples of this include the aforementioned positional relation and shape of the drive units.

In the above example, the X-axis width of the top electrodes is adjusted in accordance with the size of the signals which are unnecessary to the angular velocity sensor and are generated on the sensing electrodes when the tuning fork vibrator is driven in the X-axis direction. Alternatively, however, the width of the bottom electrodes and the width of the piezoelectric films can be adjusted at the same time. In other words, the same effects can be obtained by adjusting the width of at least the top electrodes out of the bottom electrodes, the piezoelectric films and the top electrodes making up the drive units.

INDUSTRIAL APPLICABILITY

The present invention can control the generation of signals which are unnecessary to the angular velocity sensor and are generated on the sensing electrodes when the tuning fork is made to vibrate in the X-axis direction. The present invention has high industrial applicability because of its usefulness as an angular velocity sensor which is thin in thickness and requires no individual adjustment, and also as a method for manufacturing the angular velocity sensor.

The invention claimed is:

1. An angular velocity sensor comprising:
a tuning fork vibrator having two arms and a base to support the two arms;
a drive unit formed on a main surface of each of the two arms in order to drive each of the two arms in an X-axis direction; and
a detection unit formed on the main surface of each of the two arms in order to detect vibration of each of the two arms in a Z-axis direction based on an angular velocity applied around a Y-axis, wherein
the detection unit is made up of a bottom electrode formed on the main surface of each of the two arms, a piezoelectric film formed on the bottom electrode, and a top electrode formed on the piezoelectric film;
the main surface having the detection unit thereon and a tilted side surface adjacent to the main surface cross each other at an acute angle; and
a center of at least the top electrode of the detection unit is shifted from a center of the main surface to a side opposite to the tilted side surface.

2. The angular velocity sensor of claim 1, wherein
the main surface of each of the two arms having the detection unit thereon and the tilted side surface adjacent to the main surface cross each other at an acute angle; and
the center of at least the top electrode of the detection unit is shifted by a specific amount in accordance with a degree of tilt of the tilted side surface from the center of the main surface to the side opposite to the tilted side surface.

3. An angular velocity sensor comprising:
a tuning fork vibrator having two arms and a base to support the two arms;
a drive unit formed on a main surface of each of the two arms driving each of the two arms in an X-axis direction; and
a detection unit formed on the main surface of each of the two arms in order to detect vibration of each of the two arms in a Z-axis direction based on an angular velocity applied around a Y-axis, wherein
the detection unit is made up of a bottom electrode formed on the main surface of each of the two arms, a piezoelectric film formed on the bottom electrode, and a top electrode formed on the piezoelectric film;
the main surface having the detection unit thereon and a tilted side surface adjacent to the main surface cross each other at an obtuse angle; and
a center of at least the top electrode of the detection unit is shifted from a center of the main surface to the tilted side surface.

4. The angular velocity sensor of claim 3, wherein
the main surface of each of the two arms having the detection unit thereon and the tilted side surface adjacent to the main surface cross each other at an obtuse angle; and
the center of at least the top electrode of the detection unit is shifted by a specific amount in accordance with a degree of tilt of the tilted side surface from the center of the main surface to the tilted side surface.

5. The angular velocity sensor of claim 1 or 3, wherein
the drive units are made up of bottom electrodes formed on the main surface of each of the two arms across the center of the main surface, piezoelectric films formed on the bottom electrodes, and top electrodes formed on the piezoelectric films in such a manner as to be away from each other across the center of the main surface.

6. The angular velocity sensor of claim 1 or 3, wherein
the drive units are made up of bottom electrodes formed away from each other across the center of the main surface of each of the two arms, piezoelectric films respectively formed on the bottom electrodes, and top electrodes respectively formed on the piezoelectric films.

7. The angular velocity sensor of claim 1 or 3, wherein the tuning fork vibrator is formed by dry etching.

8. The angular velocity sensor of claim 1 or 3, wherein the tuning fork vibrator is made of a silicon-based material.

9. An angular velocity sensor comprising:
a tuning fork vibrator having two arms and a base to support the two arms;
a drive unit formed on a main surface of each of the two arms in order to drive each of the two arms in an X-axis direction; and
a detection unit formed on the main surface of each of the two arms in order to detect vibration of each of the two arms in a Z-axis direction resulting from an angular velocity applied around a Y-axis, wherein
the drive unit is made up of a bottom electrode formed on the main surface, a piezoelectric film formed on the bottom electrode, and a top electrode formed on the piezoelectric film;
the main surface having the drive unit thereon and a tilted side surface adjacent to the main surface cross each other at an acute angle; and
an amount of Y-axis deformation of a part of the drive unit that is on a tilted side surface side of the center of the main surface is smaller than an amount of Y-axis deformation of a part of the drive unit that is on a side opposite to the tilted side surface side of the center of the main surface when the two arms are driven in the X-axis direction.

10. The angular velocity sensor of claim 9, wherein
the drive units are made up of bottom electrodes formed on the main surface of each of the two arms across the center of the main surface, piezoelectric films formed on the bottom electrodes, and top electrodes formed on the piezoelectric films in such a manner as to be away from each other across the center of the main surface.

11. The angular velocity sensor of claim 9, wherein
the drive units are made up of bottom electrodes formed away from each other across the center of the main surface of each of the two arms, piezoelectric films respectively formed on the bottom electrodes, and top electrodes respectively formed on the piezoelectric films.

12. The angular velocity sensor of claim 10 or 11, wherein
the main surface of each of the two arms having the drive units thereon and a tilted side surface adjacent to the main surface cross each other at an acute angle;
the top electrode that is formed on the tilted side surface side of the center of the main surface is smaller in width in the X-axis direction than the top electrode that is formed on a side opposite to the tilted side surface side of the center of the main surface; and
both the top electrodes have an equal center position and an equal length in a Y-axis direction.

13. An angular velocity sensor comprising:
a tuning fork vibrator having two arms and a base to support the two arms;
a drive unit formed on a main surface of each of the two arms in order to drive each of the two arms in an X-axis direction; and
a detection unit formed on the main surface of each of the two arms in order to detect vibration of each of the two arms in a Z-axis direction resulting from an angular velocity applied around a Y-axis, wherein
the drive unit is made up of a bottom electrode formed on the main surface, a piezoelectric film formed on the bottom electrode, and a top electrode formed on the piezoelectric film; and
in a case where the main surface having the drive unit thereon and a tilted side surface adjacent to the main surface cross each other at an obtuse angle, an amount of Y-axis deformation of a part of the drive unit that is on a tilted side surface side of the center of the main surface is made larger than an amount of Y-axis deformation of an other part of the drive unit that is on a side opposite to the tilted side surface side of the center of the main surface when the two arms are driven in the X-axis direction.

14. The angular velocity sensor of claim 13, wherein
the drive units are made up of bottom electrodes formed on the main surface of each of the two arms across the center of the main surface, piezoelectric films formed on the bottom electrodes, and top electrodes formed on the piezoelectric films in such a manner as to be away from each other across the center of the main surface.

15. The angular velocity sensor of claim 13, wherein
the drive units are made up of bottom electrodes formed away from each other across the center of the main surface of each of the two arms, piezoelectric films respectively formed on the bottom electrodes, and top electrodes respectively formed on the piezoelectric films.

16. The angular velocity sensor of claim 14 or 15, wherein
when the main surface of each of the two arms having the drive units thereon and a tilted side surface adjacent to the main surface cross each other at an obtuse angle, the top electrode that is formed on the tilted side surface side of the center of the main surface is larger in width in the X-axis direction than the top electrode that is formed on a side opposite to the tilted side surface side of the center of the main surface, and both the top electrodes have an equal center position and an equal length in a Y-axis direction.

17. The angular velocity sensor of claim 9 or 13, wherein the tuning fork vibrator is formed by dry etching.

18. The angular velocity sensor of claim 9 or 13, wherein the tuning fork vibrator is made of a silicon-based material.

19. The angular velocity sensor of claim 9 or 13, wherein the detection unit formed on the main surface of each of the two arms is made up of a bottom electrode formed on the main surface of, each of the two arms, a piezoelectric film formed on the bottom electrode, and a top electrode formed on the piezoelectric film.

* * * * *